Jan. 29, 1929.  1,700,438
W. H. HUNGERFORD
BISCUIT FACING MACHINE
Filed Oct. 22, 1924   3 Sheets-Sheet 1
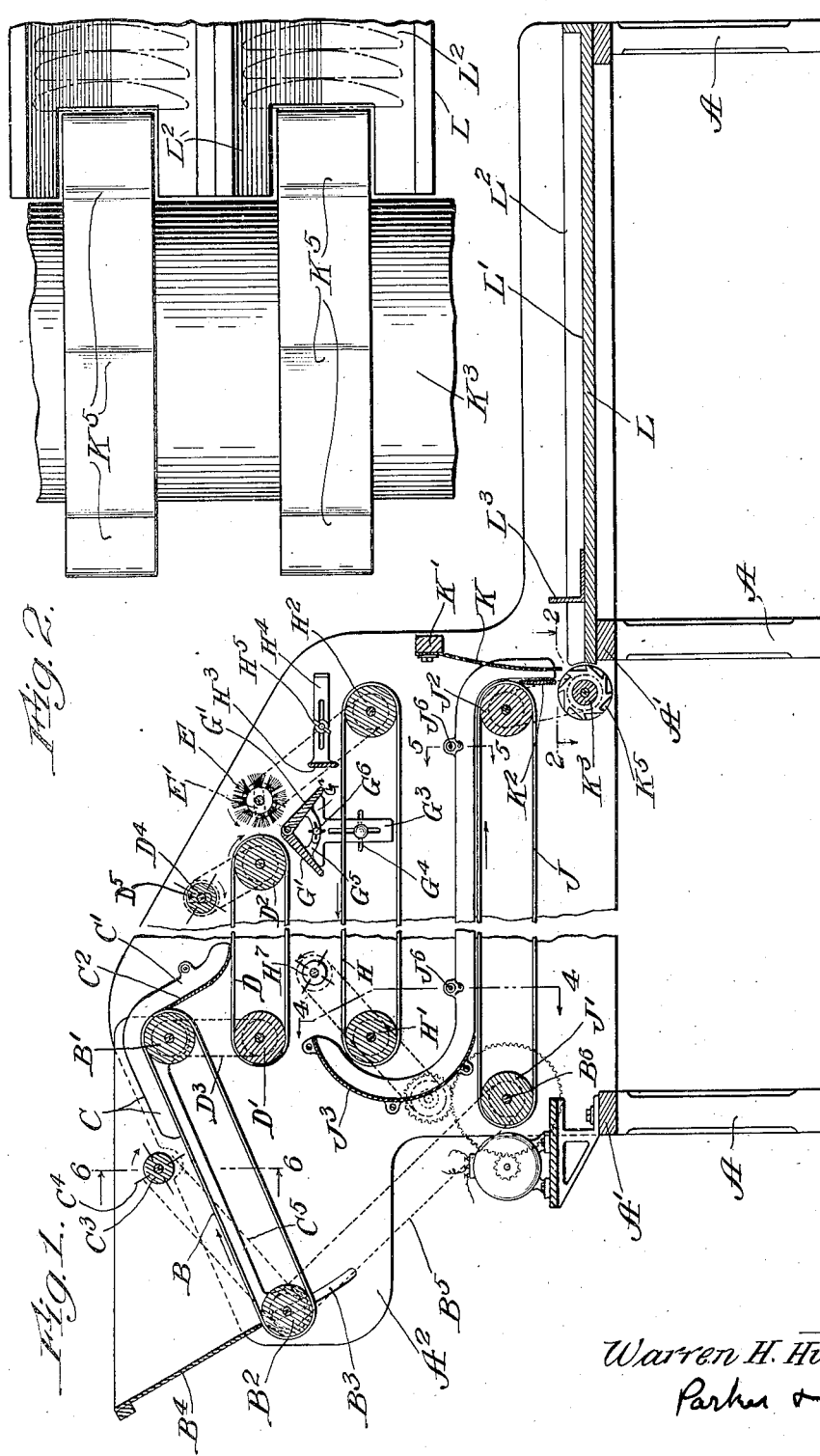
Inventor:
Warren H. Hungerford.
Parker & Carter
Attys.

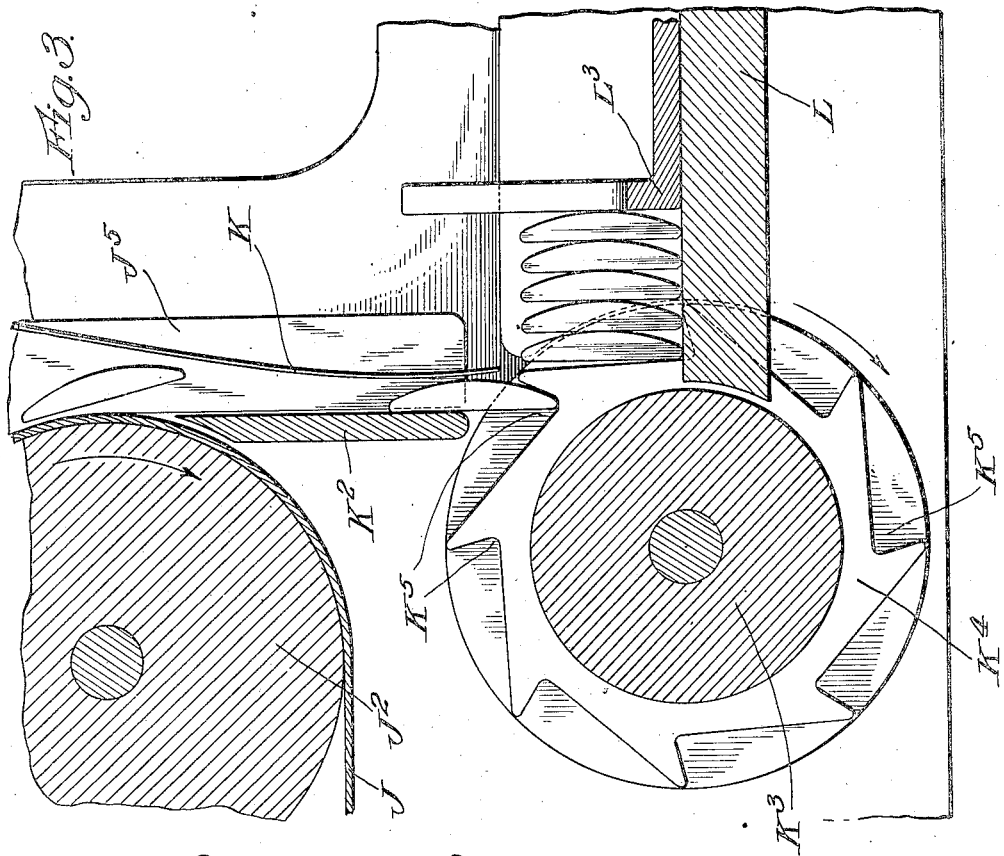
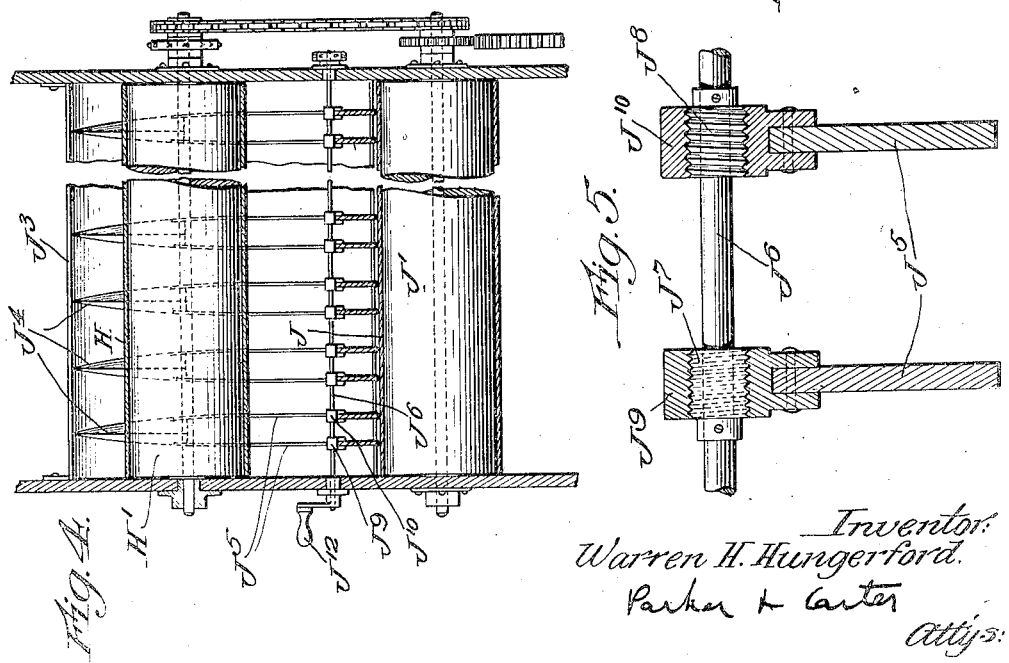

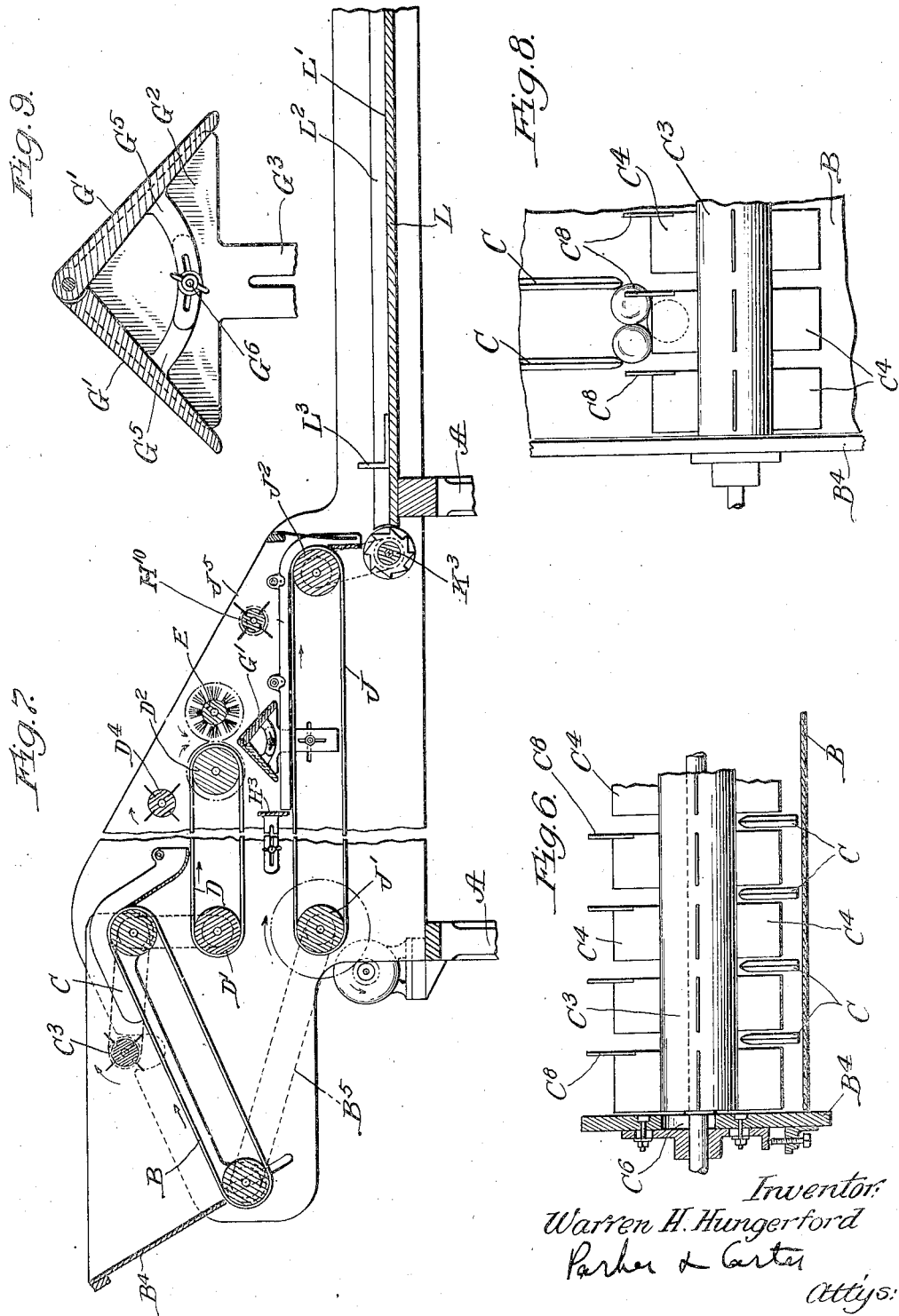

Patented Jan. 29, 1929.

1,700,438

UNITED STATES PATENT OFFICE.

WARREN H. HUNGERFORD, OF CHICAGO, ILLINOIS.

BISCUIT-FACING MACHINE.

Application filed October 22, 1924. Serial No. 745,046.

My invention relates to a facing machine and particularly to a machine adapted to face articles having opposite sides of different contours and to deliver said articles to a stacking mechanism or to any other handling means with each article having the same face facing the same direction. Other objects will appear from time to time in the course of the specification and claims.

I illustrate my invention more or less diagrammatically in the accompanying drawings wherein:

Figure 1 is a longitudinal vertical section through my device;

Figure 2 is a view on an enlarged scale along the line 2—2 of Figure 1;

Figure 3 is a detail on an enlarged scale of part of the feeding mechanism shown in Figure 1;

Figure 4 is a section on the line 4—4 of Figure 1;

Figure 5 is a partial section along the line 5—5 of Figure 1;

Figure 6 is a section on the line 6—6 of Figure 1;

Figure 7 is a longitudinal vertical section through a variant form of my device;

Figure 8 is a diagrammatical plan view to illustrate the operation of the structure shown in Figure 6; and Figure 9 is an enlarged detailed view of the deflector plates shown in Figures 2 and 7.

Like parts are illustrated by like symbols throughout the specification and drawings. A A are supporting frame members upon which are mounted the transverse members $A^1$ $A^1$ and the side frame members $A^2$ $A^2$.

B is an inclined belt passing about the guide roller $B^1$ and the drive roller $B^2$ rotatably mounted in side frame members $A^2$. The roller $B^2$ is adjustable along the slot $B^3$, to adjust the inclination of the belt B. $B^4$ is a hopper element inclosing the belt B and adjustable with it. The roller $B^2$ is driven, for example by any suitable belt $B^5$, from the main drive shaft $B^6$.

C C are a plurality of laterally spaced longitudinal guides lying along the upper part of the belt B, and conforming to the arc of the roller $B^1$, and being provided with downwardly inclined sections $C^1$ overlying the inclined chute $C^2$. The guides C may be spaced apart a constant distance at their forward ends, and along the stretch overlying the belt B, but I prefer to make the downwardly inclined sections $C^1$ laterally adjustable. I may use, for example, the lateral adjusting means shown in Figure 4 in connection with the guides $J^4$ $J^5$ overlying the belt J. $C^3$ is a rotary element, herein shown as provided with flaps or vanes $C^4$ in line with the intervals between the guides C. I have herein shown the roller as having mounted on it groups of four each of said flaps or vanes, but any other suitable number might be used. It should be understood that the belt B is driven upwardly in the direction of the arrow Figure 1 and that the rotary member $C^3$ is rotated, for example by the belt $B^5$ in opposition thereto. $C^3$ is vertically adjustable, and is preferably adjusted in such position that vanes $C^4$ will just clear the articles being faced if they lie flat and in a single layer on the belt. Thus superposed articles cannot pass forwardly over the conveyor. However, since occasionally the articles may gather in the formation shown in Figure 8 and clog the machine, I provide on some of the vanes $C^4$ a flexible member $C^8$, which may be, for example, a bit of spring steel long enough to sweep the surface of the belt and to break the arch of the articles which are jammed, thus permitting the regular flow of articles up the belt. Since the member $C^8$ is positioned at the edge of the vanes $C^4$ it does not prevent the movement of articles up the belt between the guides C.

Positioned beneath the end of the belt B and adapted to receive the articles fed between the guides $C^1$ and down the chute $C^2$ is a belt D, herein shown as horizontal, which moves about the drive roller $D^1$ and the idler $D^2$, $D^1$ being driven by means of the belt $D^3$, as shown in Figure 1. $D^4$ is a rotary element which may be similar to $C^3$, and is, like it, driven in opposition to the travel of the belt D, to prevent the passage of superposed articles along the belt. $D^4$ may be vertically adjusted along the slots $D^5$ to compensate for articles of varying thickness.

E is a rotary element, herein shown as a brush positioned in substantially horizontal alignment with the idler $D^2$, which is rotated preferably in unison with the movement of the belt D so that the articles fed along the belt D are drawn between the opposed end of the belt and the roller or brush and faced by the pressure of said opposed members.

An article with one flat face and one convex face will invariably tilt with its convex face down and said convex face will engage one or the other of the inclined slides $G^1$ and will be delivered convex side down to the succeeding conveyor H. In order to maintain sufficient compression to face the disk the member E is preferably made of resilient material, and is positioned so close to the end of the belt D that a constant compression is exerted against the articles facing therebetween. The roller E may be adjusted for example along the horizontal slot $E^1$.

The deflector plates or guides $G^1$ are positioned with their apex beneath the point of opposition of the belt D and the brush E. They may be pivoted in relation to each other and in relation to their carrier element $G^2$, which is adustable for example by means of the slotted leaf $G^3$. The horizontal slot $G^4$ in the member $A^2$ permits of horizontal adjustment of the entire deflector member. The angular adjustment of the members $G^1$ is provided by the arcuate slotted arms $G^5$ and the adjusting screw $G^6$. The purpose of these various adjustments is, in the first place, to permit the mechanism to be properly adjusted to the particular size of article with which it is being used, and second to permit the mechanism to be adjusted successively to handle articles of different thickness and different diameter.

Positioned beneath the element $G^1$ at a sufficient distance to permit the passage of the articles being faced is the belt H, passing around the rollers $H^1$ and $H^2$, and driven in the direction of the arrow. $H^3$ is the stop member adapted to receive and stop the articles delivered by the deflector in opposition to the direction of movement of the belt. The stop is longitudinally adjustable by means of the slotted leaf $H^4$ and the adjusting screw $H^5$.

Positioned beneath the conveyor H is a similar endless belt conveyor J travelling in the opposite direction. In order to deliver the articles being faced from the discharge end of the belt H to the belt J, I provide an arcuate chute $J^3$ with a plurality of longitudinal guide elements, each guide element comprising a tapered or inclined point member $J^4$ and side elements $J^5$ secured thereto. These side elements $J^5$ continue along the top of the belt J and are downwardly curved about its discharge end. They are made laterally adjustable in relation to each other in order to permit the intervening lanes down which the articles being faced travel to be adjusted to receive articles of differing widths. Any suitable lateral adjusting means may be provided, but I illustrate herein the transverse shafts $J^6$ provided with the reverse screws $J^7$ $J^8$ in mesh with the screw threaded members $J^9$ $J^{10}$ secured to the tops of each pair of elements $J^5$. The rotation of the crank $J^{12}$ will have the effect of moving each pair of side elements $J^5$ either closer together or further apart, depending upon the direction of rotation. At the discharge end of the belt J, as it passes over the roller $J^2$, I provide a plurality of downwardly depending flexible spring steel leaves K mounted, for example, on the transverse element $K^1$, and positioned between each pair of side elements $J^5$ and in opposition to the transverse chute or back plate $K^2$. $K^3$ is any suitable rotary element upon which are mounted a plurality of notched wheels $K^4$, shaped to provide the relatively deep notches $K^5$.

L is any suitable sorting table, divided into a plurality of paths or tracks $L^1$ by the longitudinal partitions $L^2$. On these tracks are the follower blocks $L^3$.

It will be realized that although I have indicated a practically operating device, nevertheless many changes might be made, in size, number, shape and disposition of parts without departing from the spirit of my invention. I wish my drawings and description be taken therefore as in a general sense illustrative rather than as limiting me to the specific mechanism herein described and shown.

The use and operation of my invention are as follows:

The most obvious use of my mechanism is for the facing of biscuits or cookies which are prevailingly made by dropping batter on a flat heated surface, and therefore naturally are formed with one flat side and one generally convex side. However, I do not wish to be limited to this use of my invention, since it may be applied for the facing of articles of widely differing material and shape.

I provide a hopper into which the articles to be faced are deposited. The bottom of the hopper is formed by an upwardly inclined belt B which is continually driven, at a relatively slow speed to convey from the hopper the articles faced. Part way up the belt I position a brush or roller or any other suitable member, and rotate it in opposition to the movement of the belt, and space it from the belt at such a height as to prevent the passage up the belt of superposed articles or groups of articles. Just above this retrograde rotary member I position guides for segregating the articles being faced into separate longitudinal paths. The first stretch of these longitudinal guides need not be adjustable, but I prefer to have the downwardly inclined stretch C¹, laterally adjustable, to permit the mechanism to handle articles of various size. The lateral adjusting mechanism, when used, may be such as is shown in Figures 4 and 5. It will be noted that the chute C² is steeply inclined, and that it is along this steeply inclined portion that the guides are preferably made laterally adjustable. Since the guides and chute are at this point set at a steep incline, the effect of the friction between the guides and the dropping article is almost nil, and there is therefore no tendency at this point for the articles to pile up owing to the damping effect of friction against the guides. In order to prevent the articles being faced from packing or bridging, as diagrammatically shown in Figure 8, between the ends of the guides C, I provide a flexible finger C³ on one of the flaps C⁴, in opposition to each lane of travel between the guides C. This flexible finger sweeps the belt, and is sufficient to break up any such jam. Thus a constant stream of the articles being sorted passes up each of the lanes and down the chute C² to the top of the belt D.

The rotary element D⁴, driven in opposition to the movement of the belt D, prevents any tendency of the articles to pile up or superpose, and permits their feed forward only in a single layer.

The articles then pass over the end of the belt D about the roller D² and are compressed between it and the opposed brush E. The facing operation of the opposed belt and brush is as follows: If a parallel sided disk were fed between the belt and brush, it would drop from between them in substantially vertical position, since the shortest distance through the disk at any one point would be a line perpendicular to each face of the disk. However when, as in the normal use of the present invention, articles are fed between the roll and the belt which have one plane side and one concave side, the shortest line through the article at its outer edge, as it escapes from between the brush and the belt, is not vertical to the plane side but inclined to it. Thus, in response to the pressure of the opposed brush and roller, the article will take that position which brings the shortest distance through it into alignment with the axis of compression, and the article will tilt, with the convex side down. In this position it drops upon one or the other of the deflector guides G¹ and is delivered thence, concave side down, to the belt H. The slides G¹ are sufficiently close to the belt and the brush so that the article is not released until it passes entirely beyond the belt or brush in direct response to the movement of belt or brush. In other words, it is not flipped or thrown, and its speed of travel is limited to the speed of travel of brush or belt. Those which travel downwardly to the right as shown in Figure 1 strikes the stop H³, which stops their retrograde movement and drops them on the belt H. This prevents any tendency there might otherwise be for the articles to pile up or be delayed at that point.

As the articles travel along the belt H they pass beneath the rotary element H⁷ which serves to limit the passage of articles to one layer. This is necessary, since sometimes an article sliding down the left slide G¹ drops upon an article moving beneath it along the belt H.

In the form of my device shown in Figure 1, in order to reverse the facing of the articles to position them convex side up I feed them to the reversing chute J³ which delivers them to the belt J. Extending along the chute J³ are the separating points J⁴ to which are secured the longitudinal guide elements J⁵ which are laterally adjustable, as above described, to vary the width of the intervening lanes. Since the chute J³ is arcuate the articles drop freely along it and in general only contact the lower inclined portion. Since the articles are either dropping freely or sliding down a steep incline, the friction of the articles against the longitudinal guides is not sufficient to damp the movement of the articles or to cause them to gather or pile up on the chute.

The articles then pass flat side down along the belt J and pass over the roller J² and downwardly in vertical position with their flat sides in opposition to the vertical chute element K². They are compressed thereagainst by the spring fingers K, as shown in Figure 3, being constrained to a vertical position as they drop downwardly upon the star-wheel element K³. The lower end of the spring finger serves to hold the articles against the star-wheel and this renders it relatively unimportant whether each article falls into a notch in the star-wheel or whether it is held against the surface of the wheel, by the spring K. In any case, as the rotation of the wheel carries the article down it clears the lower end of the spring K and is pressed forwardly along the stacking table L by the action of the wheel.

The stacking table is divided into a plurality of longitudinal lanes, and along each lane travels a sliding follower block L³. The result of the operation of my device is that the articles are fed out along the stacking table in a plurality of columns, all the articles in each column facing in like direction.

In the variant form of Figure 7 I omit the belt H and feed the articles directly to the belt J and between the horizontal guides J⁵, and beneath the rotary element H¹⁰, similar to the element H⁷ of Figure 2. The articles then travel to the right along the belt J and are faced along the table L with the convex face of each article facing toward instead of away from the star-wheel. It is possible to feed the articles to the star-wheel with their convex sides facing the wheel, because of the action of the spring fingers K, which hold each article against the star-wheel until it is carried by its rotation to a point beneath the end of the spring finger and can be thrust, by the star-wheel, outwardly along the stacking table. Thus it does not really make any difference whether or not the article drops into a notch on the star-wheel, and the main function of the outwardly inclined arms of the wheel is to thrust the articles outwardly along the stacking table.

In order to minimize the tendency of the articles being faced to pile up and clog I drive each belt at a slightly faster speed than that of the preceding belt.

I claim:

1. In a facing machine a plurality of conveyor belts, each moving faster than the preceding belt, and means for passing from belt to belt the articles being faced, and rotary facing means positioned intermediate two of said belts and in positive co-operation with one of such belts.

2. In a facing machine a plurality of conveyor belts, each moving faster than the preceding belt, and means for passing from belt to belt the articles being faced, and facing means positioned intermediate two of said belts comprising a rotary element positioned in opposition to the end of one of said belts.

3. In a facing machine a plurality of conveyor belts, each moving faster than the preceding belt, and means for passing from belt to belt the articles being faced, and facing means positioned intermediate two of said belts comprising a rotary element positioned in opposition to the end of one of said belts, and means for adjusting the distance between said belt and said opposed rotary element.

4. In a facing machine a plurality of conveyor belts, each moving faster than the preceding belt, and means for passing from belt to belt the articles being faced, and facing means positioned intermediate two of said belts comprising a rotary element positioned in opposition to the end of one of said belts and an inclined faced guide positioned beneath the area of closest approach of the belt and the rotary element.

5. A deflector guide for use with opposed facing elements of the type described, comprising a supporting element, and a plurality of slides outwardly inclined in opposite directions, and means for adjusting their angular relation.

6. A deflector guide for use with opposed facing elements of the type described, comprising a supporting element, and a plurality of slides outwardly inclined in opposite directions, and means for adjusting their angular relation.

7. A deflector guide for use with opposed facing elements of the type described, comprising a supporting element, and a plurality of slides outwardly inclined in opposite directions, and means for adjusting their angular relation and means for vertically adjusting the deflector and slides as a unit.

7. A deflector guide for use with opposed facing elements of the type described, comprising a supporting element, and a plurality of slides outwardly inclined in opposite directions, and means for adjusting their angular relation and means for horizontally adjusting the deflector and guides as a unit.

8. A deflector guide for use with opposed facing elements of the type described, comprising a supporting element, and a plurality of slides outwardly inclined in opposite directions, and means for vertically and for horizontally adjusting the deflector.

9. In a facing machine a plurality of opposed facing elements, a deflector therebeneath having slide elements downwardly and outwardly inclined, in opposite directions, a horizontal conveyor positioned beneath said deflector and means for actuating it, and a stop positioned opposite that side of the deflector which faces in opposition to the direction of travel of the conveyor.

10. In a facing machine a plurality of opposed facing elements, a deflector therebeneath having slide elements downwardly and outwardly inclined, in opposite directions, a horizontal conveyor positioned beneath said deflector and means for actuating it, and a stop positioned opposite that side of the deflector which faces in opposition to the direction of travel of the conveyor and means for adjusting said stop toward and away from said deflector.

11. In a facing machine an endless belt and gliding means therefor, means for actuating it, an opposed rotary facing element positioned in opposition to one end of said belt, and means for rotating it.

12. In a facing machine an endless belt and guiding means therefor, means for actuating it, an opposed rotary facing element positioned in opposition to one end of said belt, and means for giving it a peripheral movement substantially equal to the rate of travel of the belt.

13. In a facing machine an endless belt and guiding means therefor, means for actuating it, an opposed rotary facing element positioned in opposition to one end of said belt, and means for rotating it, and means for adjusting said rotary element toward and away from the end of said belt.

14. In a facing machine an endless belt, guiding means therefor, means for actuating it, and a rotary facing element yieldingly opposed to one end of said belt, and means for rotating it.

15. In a facing machine an endless belt having a substantially horizontal upper reach adapted to convey the articles being faced, an opposed rotary element lying in substantially the same horizontal plane as the belt, and means for rotating it, and means for receiving from said opposed belt and rotary element the articles faced thereby.

16. In a facing machine an endless belt having a substantially horizontal upper reach adapted to convey the articles being faced, an opposed rotary element lying in substantially the same horizontal plane as the belt, and means for rotating it, and means for receiving from said opposed belt and rotary element the articles faced thereby, and means for adjusting the distance between the end of said belt and said rotary element.

17. In a facing machine an endless belt having a substantially horizontal upper reach adapted to convey the articles being faced, an opposed rotary element lying in substantially the same horizontal plane as the belt, and means for rotating it, and means for receiving from said opposed belt and rotary element the articles faced thereby and a second rotary element positioned above said belt, and means for rotating it in opposition to the direction of movement of the articles conveyed by said belt.

18. In a facing machine an endless belt having a substantially horizontal upper reach adapted to convey the articles being faced, an opposed rotary element lying in substantially the same horizontal plane as the belt, and means for rotating it, and means for receiving from said opposed belt and rotary element the articles faced thereby and a second rotary element positioned above said belt, and means for rotating it in opposition to the direction of movement of the articles conveyed by said belt and means for vertically adjusting it in relation to said belt.

19. In a facing machine, a hopper, an inclined belt forming the bottom thereof, and means for actuating it, a plurality of longitudinal guides positioned along said belt, a rotary element positioned above said belt and adjacent the ends of said guides, the axis of the rotary element being parallel with the aligned ends of said guides, and means for rotating it in opposition to the movement of said belt.

20. In a facing machine a hopper, an inclined belt forming the bottom thereof, and means for actuating it, a plurality of longitudinal guides positioned along said belt, a rotary element positioned above said belt and adjacent the ends of said guides, and means for rotating it in opposition to the movement of said belt and a plurality of radial members positioned on said rotary element, and penetrating between said guides, and terminating above the surface of the belt.

21. In a facing machine a hopper, an inclined belt forming the bottom thereof, and means for actuating it, a plurality of longitudinal guides positioned along said belt, a rotary element positioned above said belt and adjacent the ends of said guides, and means for rotating it in opposition to the movement of said belt and a plurality of radial members positioned on said rotary element, and in line with the spaces between said guides, and terminating above the surface of the belt, and additional elements positioned on said rotary elements and of greater radius than said first mentioned radial members.

22. In a facing machine a hopper, an inclined belt forming the bottom thereof, and means for actuating it, a plurality of longitudinal guides positioned along said belt, a rotary element positioned above said belt and adjacent the ends of said guides, and means for rotating it in opposition to the movement of said belt and a plurality of radial members positioned on said rotary element, and in line with the spaces between said guides, and terminating above the surface of the belt and flexible strips mounted upon said rotary element and of substantially greater length than said first mentioned radial members.

23. In a facing machine, opposed facing elements adapted to direct pressure against articles passing therebetween and means for moving them in unison, a horizontal conveyor therebeneath adapted to receive the articles faced thereby, and longitudinal guides positioned along said conveyor.

24. In a facing machine, opposed facing elements adapted to direct pressure against articles passing therebetween and means for moving them in unison, a horizontal conveyor therebeneath adapted to receive the articles faced thereby, and longitudinal guides positioned along said conveyor, said longitudinal guides being transversely adjustable to control the distance between adjacent guides.

25. In a facing machine, a plurality of conveyor belts, and means for driving them, a curved chute extending from the discharge end of one of said belts to another belt, and a plurality of laterally spaced longitudinal guides positioned along said chute the chute and guides overhanging the discharge end of the upper belt.

26. In a facing machine, opposed rotary facing elements, a double faced deflector positioned beneath the zone of opposition of said opposed element, a belt positioned beneath said deflector, and a rotary element overlying said belt, and means for driving it in opposition to the movement of said belt.

27. In a facing machine, opposed rotary facing elements, a deflector positioned beneath the zone of opposition of said opposed elements, a belt positioned beneath said deflector, and means adjacent said belt for preventing the passage along said belt of superposed articles.

28. In a facing machine, opposed rotary facing elements, a deflector positioned beneath the zone of opposition of said opposed elements, a belt positioned beneath said deflector, and means adjacent said belt for preventing the passage along said belt of superposed articles, comprising a rotary element overlying said belt, and means for driving it in opposition to the movement of the belt.

29. In a facing machine, opposed rotary facing elements, a deflector positioned beneath the zone of opposition of said opposed elements, a belt positioned beneath said deflector, and means adjacent said belt for preventing the passage along said belt of superposed articles, comprising a vertically adjustable rotary element overlying said belt, and means for driving it in opposition to the movement of the belt.

30. In a facing machine a plurality of conveyor belts and means for driving them, an arcuate overhanging reversing chute adapted to receive articles discharged from the discharge end of one of said belts, and to deliver said articles to another belt, and longitudinal guides positioned along said chute.

31. In a facing machine a plurality of conveyor belts and means for driving them, an arcuate overhanging reversing chute adapted to receive articles discharged from the discharge end of one of said belts, and to deliver said articles to another belt, and longitudinal guides positioned along said chute, and means for laterally adjusting them.

Signed at Chicago, county of Cook and State of Illinois, this 13th day of October, 1924.

WARREN H. HUNGERFORD.